United States Patent [19]

Martienssen et al.

[11] Patent Number: 4,986,591
[45] Date of Patent: Jan. 22, 1991

[54] LOW PROFILE FOLDING SEAT

[75] Inventors: Robert E. Martienssen; William J. Eubank, both of Livonia, Mich.

[73] Assignee: Ford Motor Company, Dearborn, Mich.

[21] Appl. No.: 256,449

[22] Filed: Oct. 12, 1988

[51] Int. Cl.⁵ .............................................. B60N 2/16
[52] U.S. Cl. .................................. 296/65.1; 248/421; 248/423; 297/344
[58] Field of Search ................ 296/65.1; 297/379, 62, 297/63, 344, 345, 346, 378; 248/585, 421, 423

[56] References Cited

U.S. PATENT DOCUMENTS

| | | | |
|---|---|---|---|
| 1,427,280 | 8/1922 | Gahm | 297/346 X |
| 2,527,905 | 10/1950 | Barecki | 248/421 |
| 2,660,223 | 11/1953 | Appleton | 296/65.1 X |
| 3,049,330 | 8/1962 | Coons et al. | 248/421 X |
| 3,189,312 | 6/1965 | Bilancia | 296/65.1 X |
| 3,311,405 | 3/1967 | Brennan et al. | 297/63 |
| 3,322,461 | 5/1967 | Goldman et al. | 297/379 |
| 3,338,633 | 8/1967 | Jackson | 297/379 |
| 3,339,906 | 9/1967 | Persson | 297/345 X |
| 3,473,776 | 10/1969 | Costin | 248/421 X |
| 3,727,976 | 4/1973 | Lystad | 297/379 X |
| 3,973,799 | 8/1976 | Berg | 297/379 X |
| 4,034,948 | 7/1977 | Brownell | 248/423 |
| 4,045,082 | 8/1977 | Egert et al. | 297/379 X |
| 4,105,245 | 8/1978 | Simons et al. | 297/379 X |
| 4,121,802 | 10/1978 | Kluting | 248/421 |
| 4,128,225 | 12/1978 | Kluting | 248/421 |
| 4,206,946 | 6/1980 | Maertens | 297/379 X |
| 4,268,086 | 5/1981 | Okuyama | 297/63 X |
| 4,650,148 | 3/1987 | Sakamoto | 248/585 X |

FOREIGN PATENT DOCUMENTS

| | | | |
|---|---|---|---|
| 0356486 | 8/1961 | Switzerland | 297/62 |
| 2155780 | 10/1985 | United Kingdom | 297/379 |
| 2169505 | 7/1986 | United Kingdom | 297/62 |

Primary Examiner—Dennis H. Pedder
Attorney, Agent, or Firm—Daniel M. Stock; Clifford L. Sadler

[57] ABSTRACT

A stowable vehicle seat has a cushion frame supported by a parallel link arrangement positioned outboard of the seat and inboard a pair of upstanding side plates to permit optimal downward folding of the seat cushion. A latch arrangement is provided for establishing various positions between an operative elevated position and a stowed position.

14 Claims, 4 Drawing Sheets

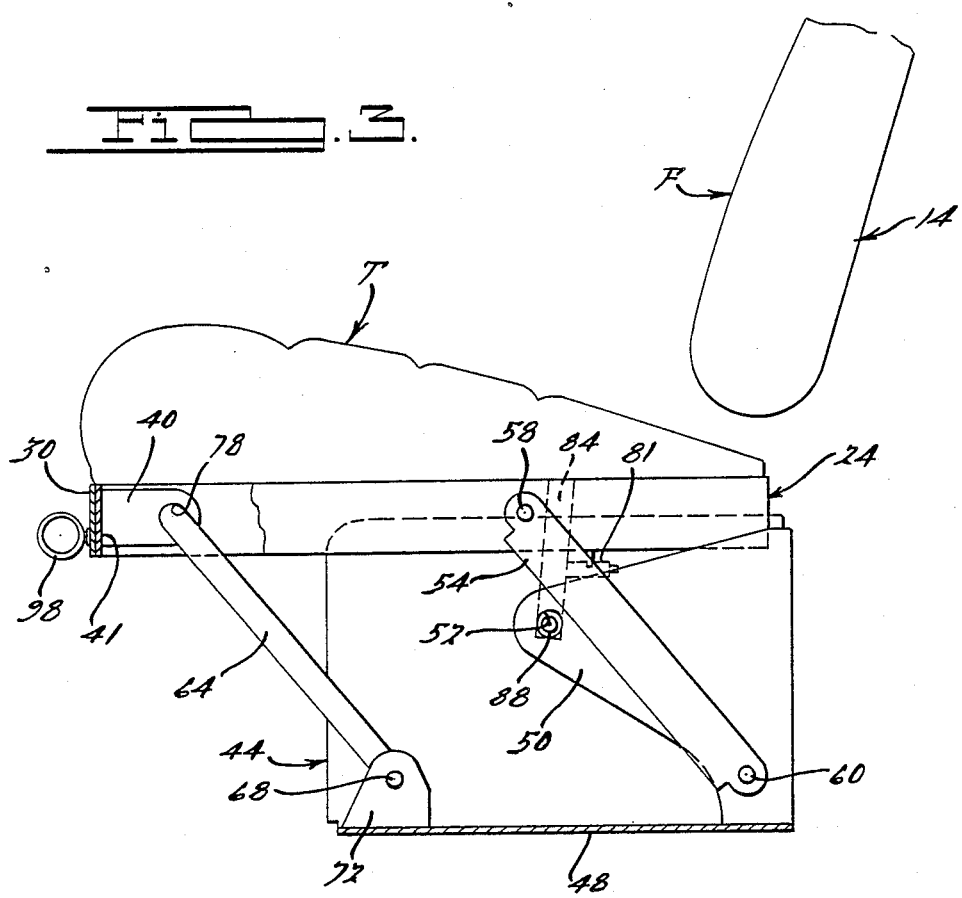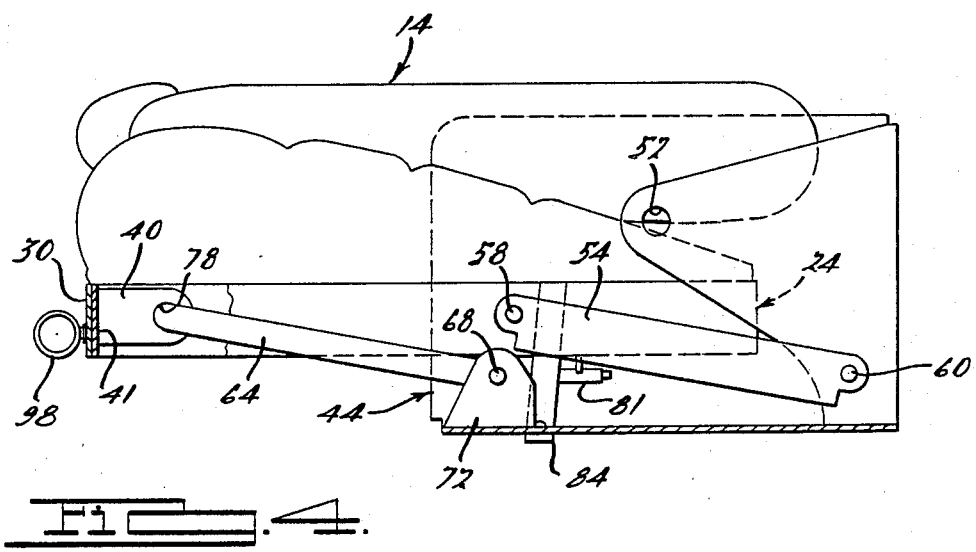

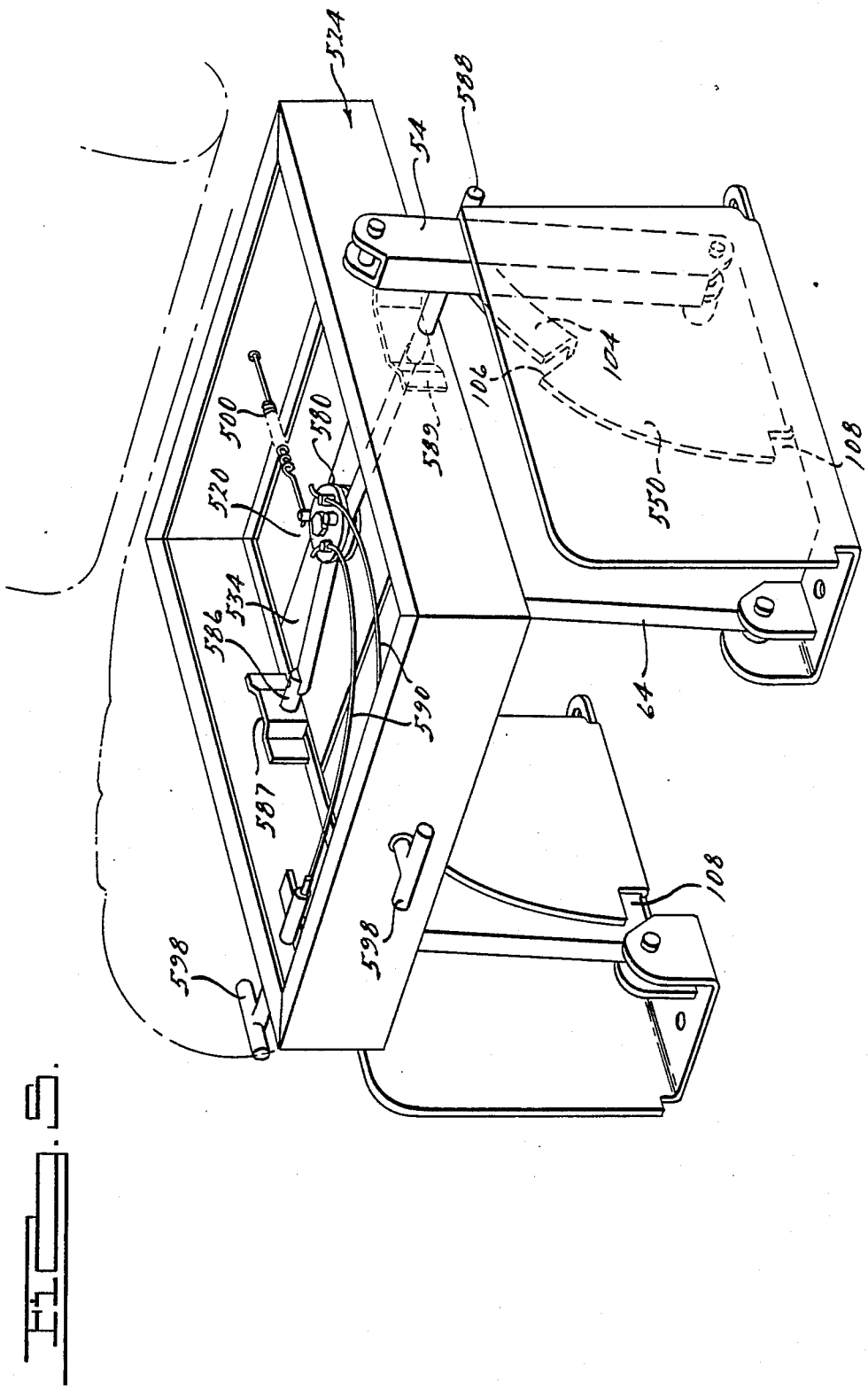

LOW PROFILE FOLDING SEAT

BACKGROUND OF THE INVENTION

The present invention relates generally to vehicle seats and more particularly to vehicle seats of the type utilized in the rear seating positions of utility vehicles having provisions for folding down the seats to form a load floor in the vehicle.

It is well known in the vehicle seating arts to provide seats which are foldable from a position in which the seat back is in its normal elevated substantially vertical seating position to a position in which the front face of the seat back engages the upper surface of the seat cushion to define a loading surface on the rear surface of the seat back. Since the seat cushion generally remains fixed on an elevated base or pedestal under which is positioned appropriate components for supporting or moving the vehicle seat, this arrangement defines a load floor having a higher elevation than is desirable in some applications.

It is also known to provide linkage with the seat base position below a seat cushion to vary its height. Bilancia, U.S. Pat. No. 3,189,312 is exemplary of such linkage arrangements showing the use of parallel link members for positioning the height of the vehicle seat cushion. Such linkages generally have been employed, however, for making relatively minor variations in the height of the seats and are arranged directly below the frame of the seat cushion in a fashion that limits the downward movement of the seat. They suffer from the further disadvantage that they undesirably expose pivoting parallel links to view an interference from within the passenger compartment of the vehicle.

Another disadvantage lies in the provision in seats of this type which employ parallel link members for adjusting the height in that provisions for latching the seat into a chosen height position are also generally provided beneath the seat frame for latching the seat into a chosen height position are also generally provided beneath the seat frame in a manner limiting its downward travel.

Another approach to the design of folding seats which can be manipulated to a stowed position defining a load floor in a vehicle is the type in which the front edge of a seat cushion is hinged to provide for rotating the seat cushion vertically upward, permitting the folding down of the seat back into the space normally occupied by the seat cushion. While this approach provides a lower load floor, it suffers from the disadvantage of reducing loading space length by the thickness of the seat cushion pivoted into the upright position.

SUMMARY OF THE INVENTION

Responsive to the deficiencies in the prior art, it is an object of the present invention to provide a stowable seat assembly for vehicles which provides for the movement of the seat cushion from an elevated seating position to a position closely proximate the vehicle floor so that the height of the load floor defined when a seat back is pivoted into engagement with the top of the seat cushion is minimized.

It is a further object of the present invention to provide such a stowable seat assembly in which the linkage mechanism provided for effecting the lowering of the seat cushion is externally shielded.

It is a further object of the present invention to provide such a stowable seat assembly in which mechanism for latching the seat in a plurality of height positions is positioned in a fashion not limiting the lowering travel of the seat cushion.

According to a feature of the present invention, a stowable seat assembly is provided in which a seat cushion frame is supported on pairs of parallel links offset form the seat cushion frame to allow free downward pivotal movement of the frame controlled by the pivotally mounted parallel links.

According to another feature of the present invention, the parallel links are carried on a mounting plate having upstanding side portions positioned laterally outward the seat cushion and the links.

According to yet another feature of the present invention, retractable pin members are carried with the seat cushion frame of the stowable seat assembly and detents configured to latchingly receive the pins are provided on the laterally outboard positioned mounting plates.

BRIEF DESCRIPTION OF THE DRAWINGS

These and other objects and features will be apparent to those skilled in the vehicle seating arts upon the reading of the following description with reference to the accompanying drawings wherein like numbers refer to like parts throughout the several views and in which:

FIG. 3 is a view similar to FIG. 2 showing the seat in a partially lowered position;

FIG. 4 is a view similar to FIGS. 2 and 3 showing the seat of FIG. 1 in the fully downwardly folded position; and FIG. 5 is a perspective view similar to FIG. 1 showing an alternative latching arrangement for the stowable seat of the present invention.

DESCRIPTION OF THE PREFERRED EMBODIMENTS

Figure 1:
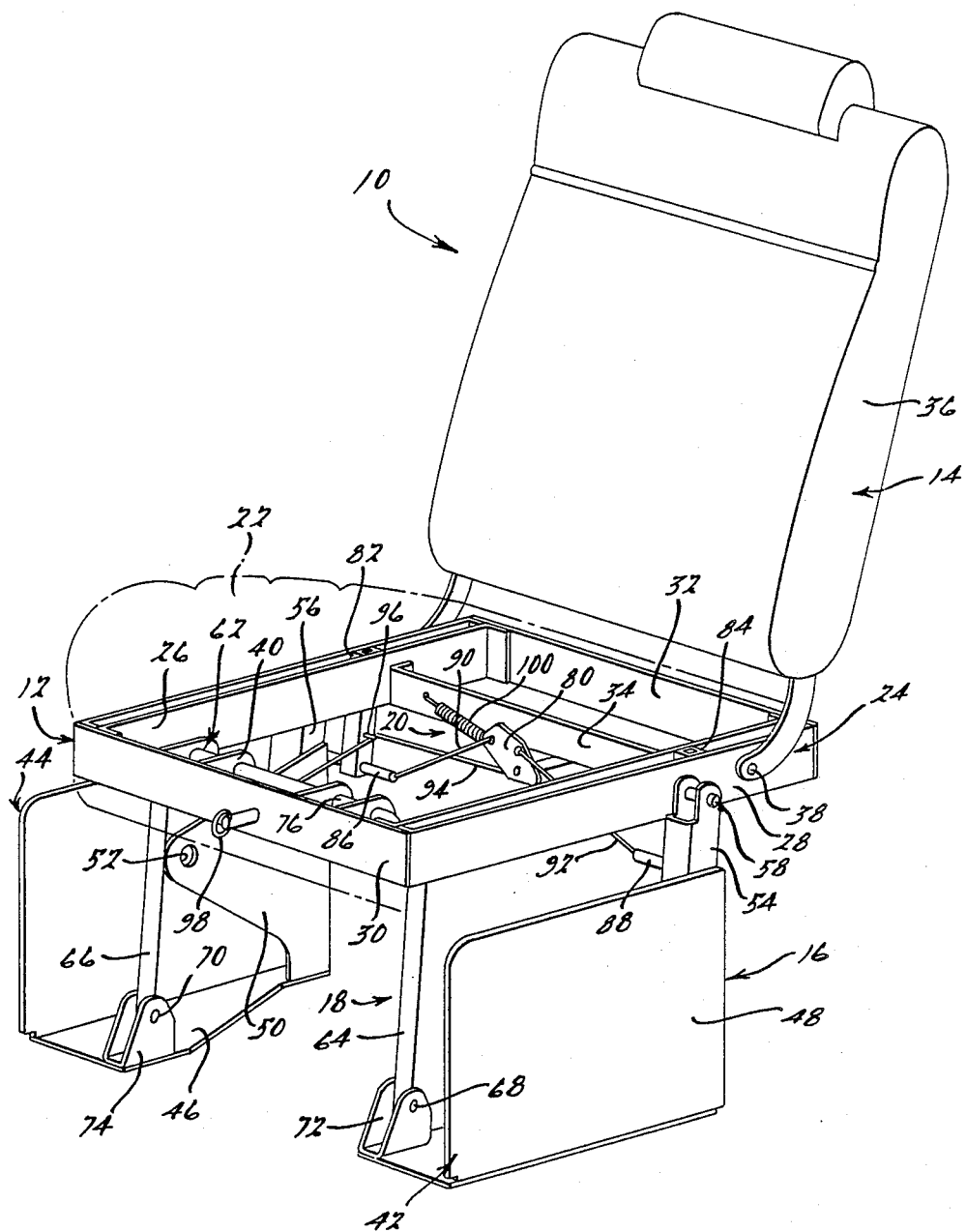
FIG. 1 is a simplified perspective view of a stowable seat assembly according to the present invention.

Turning now to the drawings, and in particular to FIG. 1, a vehicle seat assembly 10 is illustrated as comprising a seat cushion assembly 12, a seat back 14 pivotally mounted to the seat cushion assembly 12, a support frame 16, a linkage assembly 18 pivotally mounted between the seat cushion assembly 12 and the support frame 16, and a latch assembly 20.

The seat cushion assembly 12 necessarily includes a conventional cushion member 22 secured in a known manner to a generally rectangular horizontally positioned frame 24. The seat cushion frame 24 includes laterally spaced sidewalls 26, 28 which may be formed of a double-walled construction and front and rear walls 30, 32. A laterally extending brace 34 is positioned between the inner sides of the sidewalls 26, 28.

The seat back 14, which similarly includes a cushion portion 36, is pivotally mounted through pins 38 to the sidewalls 26, 28. A plurality of journal members 40 extend rearwardly from the inner face 41 of the front wall 30, as may best be seen in FIG. 2.

The support frame 16 is preferably formed as a pair of laterally spaced upstanding brackets or plates 42, 44. Each plate 42, 44 has a flat base portion 46 which is conventionally secured to the floor (not shown) of the vehicle by cooperation with known fasteners or the like. The plates 42, 44 further include generally rectangular imperforate outer shield plates 48 and generally triangular upstanding latch plates 50 spaced laterally inwardly from the shield plates 48. Each latch plate 50 includes at least one latching detent, as indicated by the forwardly positioned hole 52.

The linkage assembly 18 is simply constructed to include a pair of laterally outwardly positioned elongated link members 54, 56, each of which is pivotally mounted to the seat cushion frame 24 as indicated at a pivot pin 58 at its top end, and to the latch plate 50 as through a pin indicated at 60 at its bottom end. The linkage assembly 18 further includes a generally U-shaped bar member 62 having laterally spaced legs 64, 66 positioned laterally inwardly with respect to the rear links 54, 56 and pivotally mounted as through pins indicated at 68, 70 and upstanding trunnion mounts 72, 74 carried with the plates 42, 44, respectively of the support frame 16. A bridge portion 76 joins the leg 64, 66 being pivotally received through bores 78 in journal members 40 connected to the front wall 30 of the seat frame 24.

The latch assembly 20 consists of an actuator plate 80 rotatably mounted in known fashion such as by a journalled pin as indicated at 81 to the front face of the support brace 34. A pair of pin guides 82, 84 carried in depending fashion from the sidewalls 26, 28 of the seat cushion frame 24 are provided to carry latching pins 86, 88. The latching pins 86, 88 are resiliently biased outwardly in known fashion and are connected to the latch plate 80 by cables 90, 92. Another cable 94 connects through an eyelet 96 to the latch plate 80 at one end, and at the other end to a ring pull actuator 98. A coil spring 100 is fixed between the latch plate 80 and the brace 34 to bias the latch plate 80 toward the position shown in FIG. 1 in which the latch pins 86, 88 are urged outwardly into their latching positions.

Figure 2:
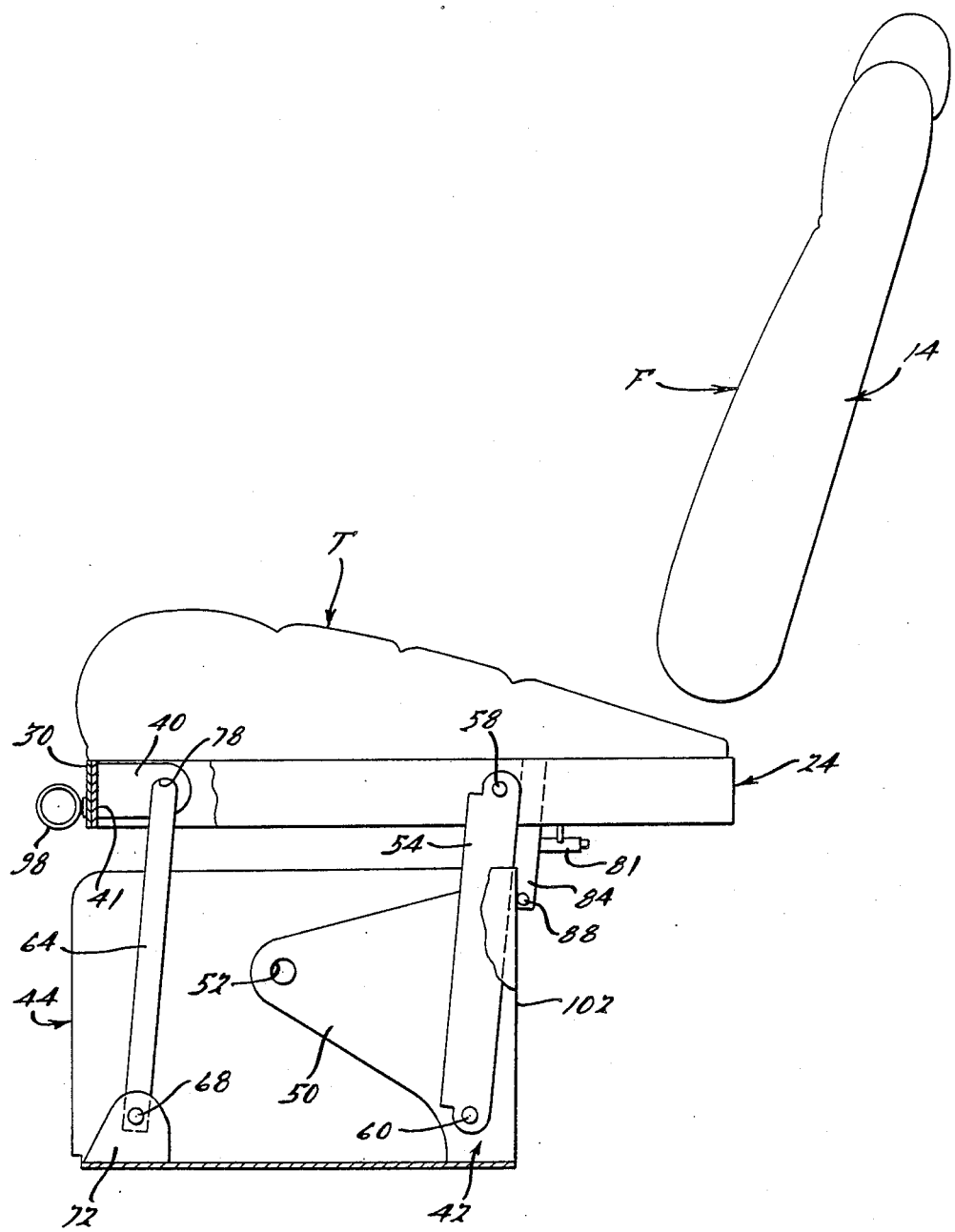
FIG. 2 is a side view of the seat of FIG. 1, certain parts broken away for clarity.

The operation of the seat assembly 10 to fold down to lowered positions can be readily appreciated by reference to FIGS. 2-4. In these views the link pivotally connecting the seat back 14 to the seat cushion assembly 12 through the pin indicated at 38 in FIG. 1 is eliminated to simplify the graphical presentation. It will be understood that any known mounting arrangement that permits pivotal movement of the seat back forwardly into a position in which its front surface F abuttingly engages the top surface T of the cushion member 22 may be employed. It will also be understood that the motion of components only on the left side of the seat assembly as it faces forward are described since the symmetrically positioned components on the other side of the seat operate identically.

In the upright position of FIG. 2, the latch pin 88 is biased outwardly to abuttingly engage a rear surface 102 of support plate 42. This holds the rear link 54 and the front leg 64, which are illustrated as being arranged in parallel fashion and being of equal length, in the operative position for occupant seating. Drawing on the ring pull 98 rotates the latch plate 80 to withdraw the latch pin 88 from abutting engagement with the surface 102 and permits the seat cushion assembly 12 to be moved forward and downwardly as shown in FIG. 3 to a position where the latch pin 88 registers with the hole 52 in the latch plate 50, the link 54 and the leg 64 pivoting counterclockwise in parallelogram fashion to control this movement. Such movement of the seat is particularly useful when it is utilized in a vehicle position in which an occupant entering the vehicle may desire such forward movement of the seat to facilitate ingress or egress to or from the rear of the seat assembly 10. A subsequent actuation of the latch assembly 20 can withdraw the pin 88 and permit further movement of the seat cushion assembly 12 to the position shown in FIG. 4. In any of the illustrated positions, the seat back 14 may be moved pivotally to rest upon the seat cushion assembly 12 as shown in FIG. 4. Downward movement of the seat cushion assembly may be stopped by abutting engagement of the latch pin holder 84 with the floor of the vehicle (not shown) or by providing other mechanical stop means.

It will be particularly noted in FIG. 4 that the fully stowed downward positioning of the seat assembly 10 is enhanced by the arrangement of the link 54 and the leg 64 in laterally spaced positions with respect to the seat cushion frame 24. The linkage structure effecting the stowing movement of the seat assembly 10 does not obstruct full downward movement of the frame 24. It will also be noted that the shield plate 48 substantially covers the linkage assembly 18 and provides for direct engagement with the latch pin 88. In some vehicle applications, it may also be useful to utilize the nonmovable support frame as a mount for components associated with the use of the seat, such as occupant restraints.

Turning now to FIG. 5, an alternative embodiment 580 of the latch plate is shown in which an offset ramp surface 104 terminating in a detent formed by an abutment surface 106 is positioned extending in arcuate fashion near the top of the plate 550. A locking notch 108 is positioned at the forward bottom edge of the plate 550. In this alternative embodiment, no depending latch pin guide members are utilized and a spring loaded guide pin 588 extends directly outwardly from the seat frame 524.

The seat assembly 510, similar to the seat assembly 10 of FIGS. 1-4 provides a latch assembly 520, having a latch plate 580 carried for horizontal rotative movement on a brace member 534 is resiliently biased into position by a return spring 500 carried on the seat cushion frame 524. Cables 590 connect with cable pulls 598 for rotating the actuator plate 580 and withdrawing outwardly spring biased pins 586, 588 slidably mounted in the seat cushion frame 524 as by brackets 587, 589. Those skilled in the art will appreciate that the number of alternatives to the latch assemblies 20 and 520 disclosed are possible and readily available. Any mechanism for selectively withdrawing and replacing a latch pin from the seat cushion frame 24 or 524 or guide structure associated with it, such as the guide members 82, 84 may be employed with the stowable seat assembly of the present invention.

When the pin 588 is withdrawn by operation of a pull, such as 598, the outer end of the pin 588 slides along the ramp surface 104, which serves as a release mechanism, until it engages the abutment 106 establishing the intermediate folded position. The seat may be restored to the upright position simply by pushing it to move rearwardly without operating the cable pull 598 to withdraw the pin 588. The fully stowed position of this seat can be established by withdrawal of the pin 588 from the position of engagement with abutment 106 and moving the seat forwardly until the pin 588 engages in the notch 108. Motion reversal from this position, of course, required operation of the cable pull 598 to withdraw the pin 588.

While only certain embodiments of the stowable seat assembly of the present invention have been described, others may be possible without departing from the scope of the appended claims.

We claim:

1. A stowable seat assembly for a vehicle comprising:
   a seat cushion assembly having a generally horizontally positioned frame;
   a seat back pivotally mounted for movement between a substantially vertical position and a substantially horizontal position wherein a front face of the seat back engages a top surface of the seat cushion assembly;
   elongated link means having one end pivotally mounted to the seat cushion frame and the other end pivotally mounted to the vehicle for movement through a pivotal path and movable between an operative position wherein the seat cushion frame is spaced from the floor of the vehicle and a stowed position wherein the seat cushion frame is lowered from said operative position to a position more proximate the vehicle floor;
   a support frame fixedly mounted to the vehicle floor and comprising a pair of spaced, vertically upstanding side plates positioned laterally outboard the seat cushion frame and the elongated link means, the side plates extending upwardly above the elongated link means when the seat back is in the horizontal position and the seat cushion is in the stowed position;
   means defining a plurality of detents on the support frame arcuately arrayed in the pivotal path of the elongated link means;
   catch means carried with the seat cushion frame and engageable with the detents for resisting movement of the seat cushion frame between the operative position and the stowed position and defining with at least one of said detents at least one intermediate position therebetween;
   means resiliently biasing the catch means into engagement with the detents; and
   means carried on the seat cushion frame for disengaging the catch means from the detents.

2. A stowable seat assembly as defined in claim 1, wherein the support frame comprises a pair of laterally outer plates and a pair of laterally inner plates, the detents being formed on the inner plates.

3. A stowable seat assembly as defined in claim 2, wherein portions of the elongated link means are mounted for pivotal movement between the inner and outer plates.

4. A stowable seat assembly as defined in claim 1, wherein the means for disengaging comprises a latch plate pivotally mounted on the seat cushion frame and cable means mounted on the seat cushion frame and operable to rotate the latch plate to disengage the catch means from the detent.

5. A stowable seat assembly for a vehicle comprising:
   a seat cushion assembly having a generally horizontally positioned frame;
   a seat back pivotally mounted on the frame for movement between a substantially vertical position and a substantially horizontal position wherein a front face of the seat back engages a top surface of the seat cushion assembly;
   elongated link means having one end pivotally mounted to the seat cushion frame and the other end pivotally mounted to the vehicle for movement through a pivotal path and movable between an operative position wherein the seat cushion frame is spaced from the floor of the vehicle and a stowed position wherein the seat cushion frame is lowered from said operative position to a position more proximate the vehicle floor;
   a support frame fixedly mounted to the vehicle floor and comprising a pair of spaced, vertically upstanding side plates positioned laterally outboard of the seat cushion frame and the elongated link means, the side plates extending upwardly above the elongated link means when the seat back is in the horizontal position and the seat cushion is in the stowed position;
   means defining a plurality of detents on the support frame arcuately arrayed in the pivotal path of the elongated link means;
   catch means carried with the seat cushion frame and engageable with the detents for resisting movement of the seat cushion frame between the operative position and the stowed position and defining with at least one of said detents at least one intermediate position therebetween;
   means resiliently biasing the catch means into engagement with the detents;
   means carried on the seat cushion frame for disengaging the catch means from the detents; and
   means carried with the support frame for permitting movement of the seat cushion frame from a position engaging one of the detents toward the operative position without operation of the means for disengaging the catch means.

6. A stowable seat assembly as defined in claim 5, wherein the means for disengaging comprises a latch plate pivotally mounted on the seat cushion frame and cable means mounted on the seat cushion frame and operable to rotate the latch plate to disengage the catch means from the detent.

7. A stowable seat assembly as defined in claim 5, wherein the support frame comprises a pair of laterally outer plates and a pair of laterally inner plates, the detents being formed on the inner plates.

8. A stowable seat assembly as defined in claim 6, wherein the release means comprises a laterally outwardly canted arcuately extending ramp formed on at least one inner plate adjacent one of the detents.

9. A stowable seat assembly as defined in claim 5, wherein portions of the elongated link means are mounted for pivotal movement between the inner and outer plates.

10. A stowable seat assembly as defined in claim 5, wherein the elongated link means comprises a pair of laterally spaced links operatively connected proximate the rear end of the seat cushion assembly and a U-shaped bar member extending laterally across the seat cushion assembly and operatively connected proximate the front end thereof, the links and the bar being arranged to effect parallelogram movement of the seat cushion assembly.

11. A stowable seat assembly as defined in claim 10, wherein portions of the elongated link means are mounted for pivotal movement between the inner and outer plates.

12. A stowable seat assembly as defined in claim 1, wherein the catch means comprises a latch pin member carried for movement with the seat cushion frame.

13. A stowable seat assembly as defined in claim 11, wherein the latch pin member includes a pin guide member mounted in depending fashion below the seat cushion frame and defining an abutment surface engageable with the support frame for limiting movement of the seat cushion assembly in the direction toward the stowed position.

14. A stowable seat assembly as defined in claim 12, wherein the latch pin member includes a pin guide member mounted in depending fashion below the seat cushion frame and defining an abutment surface engageable with the support frame for limiting movement of the seat cushion assembly in the direction toward the stowed position.

* * * * *